(12) United States Patent
Wang et al.

(10) Patent No.: US 10,204,639 B2
(45) Date of Patent: Feb. 12, 2019

(54) METHOD AND DEVICE FOR PROCESSING SOUND SIGNAL FOR COMMUNICATIONS DEVICE

(71) Applicant: Huawei Technologies Co., Ltd., Shenzhen (CN)

(72) Inventors: Zaishang Wang, Beijing (CN); Xin Zhang, Beijing (CN); Guangyuan Gao, Beijing (CN); Xianfeng Zhang, Beijing (CN); Guoquan Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/413,509

(22) Filed: Jan. 24, 2017

(65) Prior Publication Data

US 2017/0133032 A1    May 11, 2017

Related U.S. Application Data

(63) Continuation of application No. PCT/CN2014/083102, filed on Jul. 28, 2014.

(51) Int. Cl.
*H04M 1/19* (2006.01)
*H04M 1/60* (2006.01)
(Continued)

(52) U.S. Cl.
CPC ........ *G10L 21/034* (2013.01); *G10L 21/0232* (2013.01); *G10L 21/0364* (2013.01);
(Continued)

(58) Field of Classification Search
CPC ...... G10L 2021/02165; G10L 21/0208; H04M 9/085
See application file for complete search history.

(56) References Cited

U.S. PATENT DOCUMENTS 6,363,344 B1    3/2002  Higuchi
7,023,984 B1    4/2006  Short et al.
(Continued)

FOREIGN PATENT DOCUMENTS

CN    101175101 A    5/2008
CN    101420491 A    4/2009
(Continued)

OTHER PUBLICATIONS

Machine Translation and Abstract of Japanese Publication No. JP2011205289, Oct. 13, 2011, 13 pages.
(Continued)

*Primary Examiner* — Brian L Albertalli
(74) *Attorney, Agent, or Firm* — Conley Rose, P.C.

(57) ABSTRACT

A method and a device for processing a sound signal for a communications device, where a relationship between values of a volume of a first sound signal collected by a main microphone and a volume of a second sound signal collected by an auxiliary microphone is acquired by comparison, to determine a sound signal processing policy, and according to the sound signal processing policy, a sound signal to be sent to a peer communications terminal is determined, where the sound signal processing policy is used to ensure that a volume of the sound signal to be sent to the peer communications terminal exceeds a preset volume threshold.

20 Claims, 5 Drawing Sheets

(51) Int. Cl.
*H04M 9/08* (2006.01)
*H04R 3/00* (2006.01)
*G10L 21/034* (2013.01)
*G10L 21/0216* (2013.01)
*G10L 21/0232* (2013.01)
*G10L 21/0364* (2013.01)

(52) U.S. Cl.
CPC ........... *H04M 1/19* (2013.01); *H04M 1/6008* (2013.01); *H04M 9/082* (2013.01); *G10L 2021/02165* (2013.01); *H04R 3/005* (2013.01); *H04R 2430/01* (2013.01)

(56) References Cited

U.S. PATENT DOCUMENTS

| | | | |
|---|---|---|---|
| 2007/0121547 A1 | 5/2007 | Huh et al. | |
| 2007/0154031 A1 | 7/2007 | Avendano et al. | |
| 2008/0201138 A1 | 8/2008 | Visser et al. | |
| 2008/0269926 A1 | 10/2008 | Xiang et al. | |
| 2009/0274315 A1 | 11/2009 | Carnes et al. | |
| 2010/0081487 A1* | 4/2010 | Chen | G10L 21/0208 455/575.1 |
| 2010/0100374 A1 | 4/2010 | Park et al. | |
| 2012/0008802 A1* | 1/2012 | Felber | H03G 3/24 381/107 |
| 2012/0189147 A1* | 7/2012 | Terada | H04R 25/407 381/313 |
| 2012/0253798 A1* | 10/2012 | Walters | G10L 21/0208 704/226 |
| 2012/0284023 A1* | 11/2012 | Vitte | H04M 9/082 704/233 |
| 2013/0034242 A1 | 2/2013 | Prentice et al. | |
| 2013/0332157 A1 | 12/2013 | Iyengar et al. | |
| 2014/0142935 A1 | 5/2014 | Lindahl et al. | |
| 2014/0278393 A1* | 9/2014 | Ivanov | G10L 15/20 704/233 |
| 2015/0142426 A1 | 5/2015 | Song et al. | |
| 2015/0212792 A1* | 7/2015 | Liu | H04R 3/005 715/727 |
| 2016/0261951 A1* | 9/2016 | Matheja | G10L 21/0232 |
| 2017/0133032 A1 | 5/2017 | Wang et al. | |

FOREIGN PATENT DOCUMENTS

| | | |
|---|---|---|
| CN | 101699831 A | 4/2010 |
| CN | 202889458 U | 4/2013 |
| CN | 203138541 U | 8/2013 |
| CN | 103325378 A | 9/2013 |
| CN | 103873625 A | 6/2014 |
| CN | 103905646 A | 7/2014 |
| EP | 2835958 A1 | 2/2015 |
| JP | H108149197 A | 6/1996 |
| JP | H09326844 A | 12/1997 |
| JP | 2009153053 A | 7/2009 |
| JP | 2011205289 A | 10/2011 |
| JP | 2013223134 A | 10/2013 |
| KR | 100798623 B1 | 1/2008 |
| KR | 101120970 B1 | 3/2012 |
| KR | 20130012073 A | 1/2013 |
| KR | 101883421 B1 | 7/2018 |
| WO | 2014023183 A1 | 2/2014 |

OTHER PUBLICATIONS

Machine Translation and Abstract of Japanese Publication No. JP2013223134, Oct. 28, 2013, 17 pages.
Foreign Communication From a Counterpart Application, Japanese Application No. JP2017-503018, Japanese Office Action dated Apr. 3, 2018, 2 pages.
Foreign Communication From a Counterpart Application, Japanese Application No. JP2017-503018, English Translation of Japanese Office Action dated Apr. 3, 2018, 2 pages.
Foreign Communication From a Counterpart Application, Korean Application No. 10-2017-7004561, Korean Office Action dated Sep. 12, 2017, 5 pages.
Foreign Communication From a Counterpart Application, Korean Application No. 10-2017-7004561, English Translation of Korean Office Action dated Sep. 12, 2017, 4 pages.
Machine Translation and Abstract of Japanese Publication No. JP2009153053, Jul. 9, 2009, 7 pages.
Foreign Communication From a Counterpart Application, Korean Application No. 10-2017-7004561, Korean Notice of Allowance and Brief Translation dated Apr. 25, 2018, 3 pages.
Machine Translation and Abstract of Chinese Publication No. CN101175101, May 7, 2008, 7 pages.
Machine Translation and Abstract of Chinese Publication No. CN101699831, Apr. 28, 2010, 11 pages.
Machine Translation and Abstract of Chinese Publication No. CN103905646, Jul. 2, 2014, 8 pages.
Machine Translation and Abstract of Chinese Publication No. CN203138541, Aug. 21, 2013, 5 pages.
Foreign Communication From a Counterpart Application, European Application No. 14898566.6, Extended European Search Report dated Jun. 14, 2017, 7 pages.
Foreign Communication From a Counterpart Application, Chinese Application No. 201480036864.7, Chinese Office Action dated May 16, 2017, 6 pages.
Foreign Communication From a Counterpart Application, PCT Application No. PCT/CN2014/083102, English Translation of International Search Report dated Apr. 29, 2015, 2 pages.
Foreign Communication From a Counterpart Application, PCT Application No. PCT/CN2014/083102, English Translation of Written Opinion dated Apr. 29, 2015, 6 pages.
Foreign Communication From a Counterpart Application, Korean Application No. 2018-053286515, Korean Office Action dated Aug. 6, 2018, 8 pages.
Foreign Communication From a Counterpart Application, Korean Application No. 2018-053286515, English Translation of Korean Office Action dated Aug. 6, 2018, 7 pages.
Foreign Communication From A Counterpart Application, Brazilian Application No. 112017001558-7, Brazilian Office Action dated Aug. 23, 2018, 8 pages.
Foreign Communication From A Counterpart Application, Korean Application No. 2018-078622369, Korean Notice of Allowance dated Nov. 19, 2018, 3 pages.

\* cited by examiner

METHOD AND DEVICE FOR PROCESSING SOUND SIGNAL FOR COMMUNICATIONS DEVICE

CROSS-REFERENCE TO RELATED APPLICATIONS

This application is a continuation of International Patent Application No. PCT/CN2014/083102 filed on Jul. 28, 2014, which is hereby incorporated by reference in its entirety.

TECHNICAL FIELD

The present disclosure relates to communications technologies, and in particular, to a method and a device for processing a sound signal for a communications device.

BACKGROUND

With development of communications technologies, products of communications devices are increasingly widely used, including smart terminal devices, such as a wireless walkie-talkie, a shortwave radio station, and a mobile phone. To implement clear voice communication in a noisy environment, a method of noise reduction using a microphone needs to be used to eliminate noise. Therefore, two types of microphones are generally disposed on a communications device, where one is a main microphone and the other is an auxiliary microphone. Generally, only one main microphone is disposed, and one or more auxiliary microphones may be disposed. The main microphone is a microphone used by a user during a call, and is configured to collect a voice signal produced by the user, and the auxiliary microphone is configured to collect an ambient noise signal around the communications device. A noise-reduced voice signal may be obtained by performing acoustic filtering between the sound signal collected by the main microphone and the ambient noise signal collected by the auxiliary microphone, and the noise-reduced voice signal is transferred to a peer communications terminal such that a user of the peer communications terminal can hear relatively clear voice.

However, when the communications device on which noise is reduced using the main and auxiliary microphones is used, a problem that a volume of voice heard by the user of the peer communications terminal is very small or even no sound can be heard often occurs.

SUMMARY

Embodiments of the present disclosure provide a method and a device for processing a sound signal for a communications device, to resolve a problem that in a communication process, a volume of voice heard by a user of a peer communications terminal is small or even no sound is heard.

According to a first aspect, an embodiment of the present disclosure provides a method for processing a sound signal for a communications device, where the method includes acquiring a first sound signal collected by a main microphone and a second sound signal collected by an auxiliary microphone, determining a sound signal processing policy according to a relationship between values of a volume of the first sound signal and a volume of the second sound signal, and determining, according to the sound signal processing policy, a sound signal that is to be sent to a peer communications terminal, where the sound signal processing policy is used to ensure that a volume of the sound signal that is to be sent to the peer communications terminal exceeds a preset volume threshold.

With reference to the first aspect, in a first possible implementation manner of the first aspect, the sound signal processing policy includes a first sound signal processing policy, and determining a sound signal processing policy according to a relationship between values of a volume of the first sound signal and a volume of the second sound signal includes determining that the sound signal processing policy is the first sound signal processing policy if the volume of the first sound signal is less than the volume of the second sound signal, where the first sound signal processing policy includes determining whether the volume of the second sound signal is greater than or equal to the preset volume threshold, and determining, according to the sound signal processing policy, a sound signal that is to be sent to a peer communications terminal includes sending the second sound signal collected by the auxiliary microphone to the peer communications terminal if the volume of the second sound signal is greater than or equal to the preset volume threshold, or increasing the volume of the second sound signal if the volume of the second sound signal is less than the preset volume threshold, where the volume of the second sound signal is increased to be greater than or equal to the preset volume threshold, and sending the second sound signal whose volume is increased to the peer communications terminal.

With reference to the first aspect, in a second possible implementation manner of the first aspect, the sound signal processing policy includes a second sound signal processing policy, and determining a sound signal processing policy according to a relationship between values of a volume of the first sound signal and a volume of the second sound signal includes determining that the sound signal processing policy is the second sound signal processing policy if the volume of the first sound signal is greater than the volume of the second sound signal, where the second sound signal processing policy includes performing acoustic filtering between the first sound signal and the second sound signal, to obtain a third sound signal, and determining whether a volume of the third sound signal is greater than or equal to the preset volume threshold, and determining, according to the sound signal processing policy, a sound signal that is to be sent to a peer communications terminal includes sending the third sound signal to the peer communications terminal if the volume of the third sound signal is greater than or equal to the preset volume threshold, or performing a volume amplification processing operation if the volume of the third sound signal is less than the preset volume threshold, where the volume of the sound signal is increased to be greater than or equal to the preset volume threshold after the volume amplification processing operation is performed, and sending the sound signal after the volume amplification processing operation is performed to the peer communications terminal.

With reference to the first aspect, in a third possible implementation manner of the first aspect, the sound signal processing policy includes a third sound signal processing policy, and determining a sound signal processing policy according to a relationship between values of a volume of the first sound signal and a volume of the second sound signal includes determining that the sound signal processing policy is the third sound signal processing policy if the volume of the first sound signal is equal to the volume of the second sound signal, where the third sound signal processing policy includes decreasing the volume of the second sound signal, and performing acoustic filtering between the first sound signal and the second sound signal whose volume is decreased, to obtain a fourth sound signal, and determining whether a volume of the fourth sound signal is greater than or equal to the preset volume threshold, and determining, according to the sound signal processing policy, a sound signal that is to be sent to a peer communications terminal includes sending the fourth sound signal to the peer communications terminal if the volume of the fourth sound signal is greater than or equal to the preset volume threshold, or performing a volume amplification processing operation if the volume of the fourth sound signal is less than the preset volume threshold, where the volume of the sound signal is increased to be greater than or equal to the preset volume threshold after the volume amplification processing operation is performed, and sending the sound signal after the volume amplification processing operation is performed to the peer communications terminal.

With reference to the second or the third possible implementation manner of the first aspect, in a fourth possible implementation manner of the first aspect, performing a volume amplification processing operation, where the volume of the sound signal is increased to be greater than or equal to the preset volume threshold after the volume amplification processing operation is performed, and sending the sound signal after the volume amplification processing operation is performed to the peer communications terminal includes decreasing the volume of the second sound signal, and performing acoustic filtering between the first sound signal and the second sound signal whose volume is decreased, to obtain a fifth sound signal, where a volume of the fifth sound signal is greater than or equal to the preset volume threshold, and sending the fifth sound signal to the peer communications terminal, or increasing the volume of the first sound signal, performing acoustic filtering between the first sound signal whose volume is increased and the second sound signal, to obtain a sixth sound signal, where a volume of the sixth sound signal is greater than or equal to the preset volume threshold, and sending the sixth sound signal to the peer communications terminal, or decreasing the volume of the second sound signal, increasing the volume of the first sound signal, performing acoustic filtering between the first sound signal whose volume is increased and the second sound signal whose volume is decreased, to obtain a seventh sound signal, where a volume of the seventh sound signal is greater than or equal to the preset volume threshold, and sending the seventh sound signal to the peer communications terminal.

With reference to the first aspect or any one of the first to the fourth possible implementation manners of the first aspect, in a fifth possible implementation manner of the first aspect, before determining a sound signal processing policy according to a relationship between values of a volume of the first sound signal and a volume of the second sound signal, the method further includes determining whether the volume of the first sound signal and the volume of the second sound signal are greater than or equal to a minimum volume threshold, and performing the step of determining a sound signal processing policy according to a relationship between values of a volume of the first sound signal and a volume of the second sound signal if both the volume of the first sound signal and the volume of the second sound signal are greater than or equal to the minimum volume threshold, where the minimum volume threshold is less than the preset volume threshold.

With reference to the fifth possible implementation manner of the first aspect, in a sixth possible implementation manner of the first aspect, the minimum volume threshold is 20 decibel (dB), and the preset volume threshold is 40 dB.

According to a second aspect, an embodiment of the present disclosure provides a device for processing a sound signal, including a main microphone configured to collect a first sound signal, an auxiliary microphone configured to collect a second sound signal, a receiver configured to acquire the first sound signal collected by the main microphone and the second sound signal collected by the auxiliary microphone, a processor configured to determine a sound signal processing policy according to a relationship between values of a volume of the first sound signal and a volume of the second sound signal, and a transmitter configured to determine, according to the sound signal processing policy, a sound signal that is to be sent to a peer communications terminal, where the sound signal processing policy is used to ensure that a volume of the sound signal that is to be sent to the peer communications terminal exceeds a preset volume threshold.

With reference to the second aspect, in a first possible implementation manner of the second aspect, the sound signal processing policy includes a first sound signal processing policy, and the processor is further configured to determine that the sound signal processing policy is the first sound signal processing policy if the volume of the first sound signal is less than the volume of the second sound signal, where the first sound signal processing policy includes determining whether the volume of the second sound signal is greater than or equal to the preset volume threshold, and the transmitter is further configured to send the second sound signal collected by the auxiliary microphone to the peer communications terminal if the volume of the second sound signal is greater than or equal to the preset volume threshold, or increase the volume of the second sound signal if the volume of the second sound signal is less than the preset volume threshold, where the volume of the second sound signal is increased to be greater than or equal to the preset volume threshold, and send the second sound signal whose volume is increased to the peer communications terminal.

With reference to the second aspect, in a second possible implementation manner of the second aspect, the sound signal processing policy further includes a second sound signal processing policy, and the processor is further configured to determine that the sound signal processing policy is the second sound signal processing policy if the volume of the first sound signal is greater than the volume of the second sound signal, where the second sound signal processing policy includes performing acoustic filtering between the first sound signal and the second sound signal, to obtain a third sound signal, and determining whether a volume of the third sound signal is greater than or equal to the preset volume threshold, and the transmitter is further configured to send the third sound signal to the peer communications terminal if the volume of the third sound signal is greater than or equal to the preset volume threshold, or perform a volume amplification processing operation if the volume of the third sound signal is less than the preset volume threshold, where the volume of the sound signal is increased to be greater than or equal to the preset volume threshold after the volume amplification processing operation is performed, and send the sound signal after the volume amplification processing operation is performed to the peer communications terminal.

With reference to the second aspect, in a third possible implementation manner of the second aspect, the sound signal processing policy includes a third sound signal processing policy, and the processor is further configured to determine that the sound signal processing policy is the third sound signal processing policy if the volume of the first sound signal is equal to the volume of the second sound signal, where the third sound signal processing policy includes decreasing the volume of the second sound signal, and performing acoustic filtering between the first sound signal and the second sound signal whose volume is decreased, to obtain a fourth sound signal, and determining whether a volume of the fourth sound signal is greater than or equal to the preset volume threshold, and the transmitter is further configured to send the fourth sound signal to the peer communications terminal if the volume of the fourth sound signal is greater than or equal to the preset volume threshold, or perform a volume amplification processing operation if the volume of the fourth sound signal is less than the preset volume threshold, where the volume of the sound signal is increased to be greater than or equal to the preset volume threshold after the volume amplification processing operation is performed, and send the sound signal after the volume amplification processing operation is performed to the peer communications terminal.

With reference to the second or the third possible implementation manner of the second aspect, in a fourth possible implementation manner of the second aspect, the transmitter is further configured to decrease the volume of the second sound signal, perform acoustic filtering between the first sound signal and the second sound signal whose volume is decreased, to obtain a fifth sound signal, where a volume of the fifth sound signal is greater than or equal to the preset volume threshold, and send the fifth sound signal to the peer communications terminal, or increase the volume of the first sound signal, perform acoustic filtering between the first sound signal whose volume is increased and the second sound signal, to obtain a sixth sound signal, where a volume of the sixth sound signal is greater than or equal to the preset volume threshold, and send the sixth sound signal to the peer communications terminal, or decrease the volume of the second sound signal, increase the volume of the first sound signal, perform acoustic filtering between the first sound signal whose volume is increased and the second sound signal whose volume is decreased, to obtain a seventh sound signal, where a volume of the seventh sound signal is greater than or equal to the preset volume threshold, and send the seventh sound signal to the peer communications terminal.

With reference to the second aspect or any one of the first to the fourth possible implementation manners of the second aspect, in a fifth possible implementation manner of the second aspect, the processor is further configured to determine whether the volume of the first sound signal and the volume of the second sound signal are greater than or equal to a minimum volume threshold, perform the step of determining a sound signal processing policy according to a relationship between values of a volume of the first sound signal and a volume of the second sound signal if both the volume of the first sound signal and the volume of the second sound signal are greater than or equal to the minimum volume threshold, where the minimum volume threshold is less than the preset volume threshold.

With reference to the fifth possible implementation manner of the second aspect, in a sixth possible implementation manner of the second aspect, the minimum volume threshold is 20 dB, and the preset volume threshold is 40 dB.

According to the method and the device for processing a sound signal for a communications device provided in the embodiments of the present disclosure, a relationship between values of a volume of a first sound signal collected by a main microphone and a volume of a second sound signal collected by an auxiliary microphone is acquired by comparison, to determine a sound signal processing policy such that after the sound signal processing policy is used, a volume of a sound signal that is to be sent to a peer communications terminal exceeds a preset volume threshold, resolving a problem that in a communication process, a volume of voice heard by a user of a peer communications terminal is small or even no sound is heard.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure shall fall within the protection scope of the present disclosure.

A problem, where a volume of voice heard at a peer communications terminal is very small or even no sound is heard is analyzed in detail, and the following results are obtained.

A main microphone and an auxiliary microphone on a communications device are disposed at different positions, where the main microphone is generally disposed on a lower end of the communications device, and the auxiliary microphone is disposed on the lower end, or may be disposed on a lateral end, or another disposing method is used. However, regardless of which disposing position is used, different holding gestures of a user in a communication process lead to different relative distances between the main microphone and the user, and between the auxiliary microphone and the user. Then volumes of sound signals collected by the main microphone and the auxiliary microphone are different, and after acoustic filtering is performed between the sound signals collected by the main microphone and the auxiliary microphone to reduce noise, a problem that a volume of voice heard at a peer communications terminal is very small or even no sound is heard is caused. Therefore, adjustment needs to be performed according to a relationship between values of the volumes of the sound signals collected by the main microphone and the auxiliary microphone such that a volume of voice sent to the peer communications terminal can meet a user requirement.

Therefore, the present disclosure provides the following embodiments.

Figure 1:
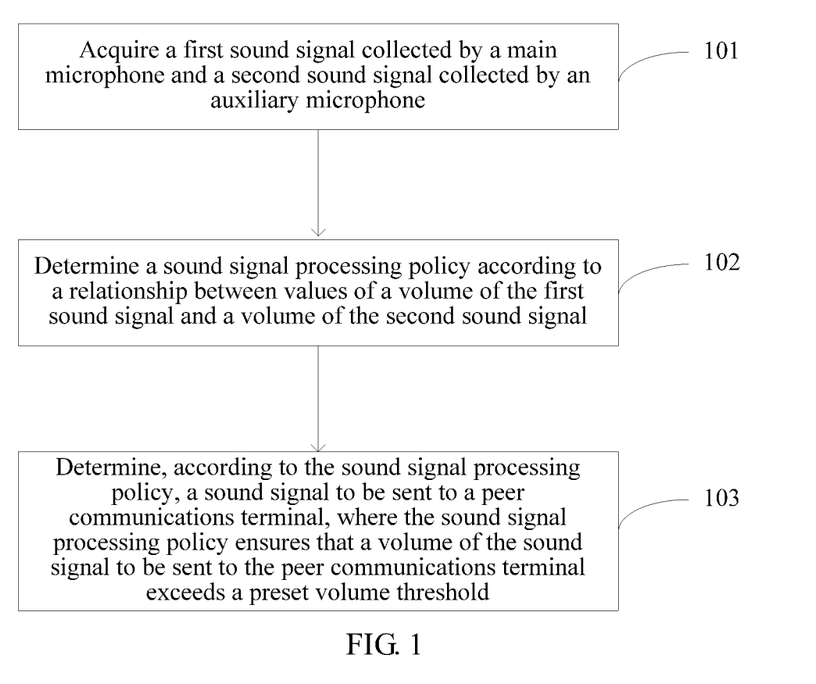
FIG. 1 is a flowchart of an embodiment of a method for processing a sound signal according to the present disclosure.

FIG. 1 is a flowchart of an embodiment of a method for processing a sound signal according to the present disclosure. As shown in FIG. 1, the method includes the following steps.

Step 101: Acquire a first sound signal collected by a main microphone and a second sound signal collected by an auxiliary microphone.

In this step, the first sound signal collected by the main microphone is mainly a sound signal produced by a person, and the second sound signal collected by the auxiliary microphone is mainly an ambient noise signal.

Step 102: Determine a sound signal processing policy according to a relationship between values of a volume of the first sound signal and a volume of the second sound signal.

In this step, because the main microphone and the auxiliary microphone are disposed at different positions and a user holds a communications device with different gestures, a volume of a sound signal collected by the main microphone and a volume of a sound signal collected by the auxiliary microphone are different. A volume of the first sound signal collected by the main microphone and acquired in step 101 is compared with a volume of the second sound signal collected by the auxiliary microphone and acquired in step 101, and a sound signal processing policy is determined according to a relationship between values of volumes of the two sound signals. The sound signal processing policy may include to make a sound signal to be sent to a peer communications terminal meet a user requirement, that is, a user can hear sound, sending a sound signal collected by a microphone to the peer communications terminal, or sending, to the peer communications terminal, a sound signal obtained after adjusting the volumes of the sound signals collected by the main microphone and the auxiliary microphone and performing acoustic filtering.

Step 103: Determine, according to the sound signal processing policy, a sound signal to be sent to a peer communications terminal, where the sound signal processing policy ensures that a volume of the sound signal to be sent to the peer communications terminal exceeds a preset volume threshold.

According to the sound signal processing policy determined in step 102, a sound signal collected by a microphone is selected and sent to the peer communications terminal, or the volumes of the sound signals collected by the main microphone and the auxiliary microphone are correspondingly adjusted and then a sound signal after processing is sent to the peer communications terminal, to meet that a volume of the sound signal sent to the peer communications terminal exceeds the preset volume threshold, overcoming a problem that a volume of voice heard at the peer communications terminal is small or even no sound is heard. The preset volume threshold may be generally set to a decibel value of a normal indoor conversation described according to a hearing feature of persons. The peer communications terminal may be a mobile phone, or another mobile terminal device having a communications module.

According to the method for processing a sound signal in this embodiment, a relationship between values of volumes of a first sound signal collected by a main microphone and a second sound signal collected by an auxiliary microphone is acquired by comparison, to determine a sound signal processing policy such that after the sound signal processing policy is used, a volume of a sound signal that is to be sent to a peer communications terminal exceeds a preset volume threshold. The relationship between the values of the volumes of the first sound signal collected by the main microphone and the second sound signal collected by the auxiliary microphone is analyzed, and different sound signal processing policies are used, that is, a sound signal collected by a microphone is used as a sound signal to be sent to the peer communications terminal, or a sound signal obtained after correspondingly adjusting the volume of the first sound signal or the volume of the second sound signal and performing acoustic filtering is used as a sound signal to be sent to the peer communications terminal, to ensure that a volume of the sound signal that is to be sent to the peer communications terminal is greater than the volume threshold, resolving a problem in a communication process, a volume of voice heard by a user of a peer communications terminal is small or even no sound is heard.

A technical solution of the method embodiment shown in FIG. 1 is described below in detail according to different scenarios using several specific embodiments.

When a user uses a communications device to perform voice communication, for example, several cases usually occur as follows.

Case 1: A finger of the user may block a hole of a main microphone when the user holds the communications device, and the main microphone cannot collect a sound signal produced by the user. In this case, if an auxiliary microphone normally collects an ambient noise signal, a volume of a sound signal obtained by the communications device through processing and that is to be sent to a peer communications terminal may be "zero."

Case 2: A hole of a main microphone on the communications device may be far from the mouth of the user if a size of the communications device held by the user is large, and a volume of a sound signal collected by the main microphone is relatively small. Similarly, if an auxiliary microphone normally collects an ambient noise signal, a volume of a sound signal obtained by the communications device through processing and to be sent to a peer communications terminal may be smaller, or may be even "zero."

Case 3: A distance between a main microphone and the user and a distance between an auxiliary microphone and the user may be approximately the same when the communications device is relatively far from the user. In this case, a volume of a sound signal collected by the main microphone and a volume of a sound signal collected by the auxiliary microphone are approximately the same, and the sound signal collected by the main microphone and the sound signal collected by the auxiliary microphone may be mutually canceled. Therefore, a volume of a sound signal obtained by the communications device through processing and to be sent to a peer communications terminal is very small, or may be even "zero."

Figure 2:
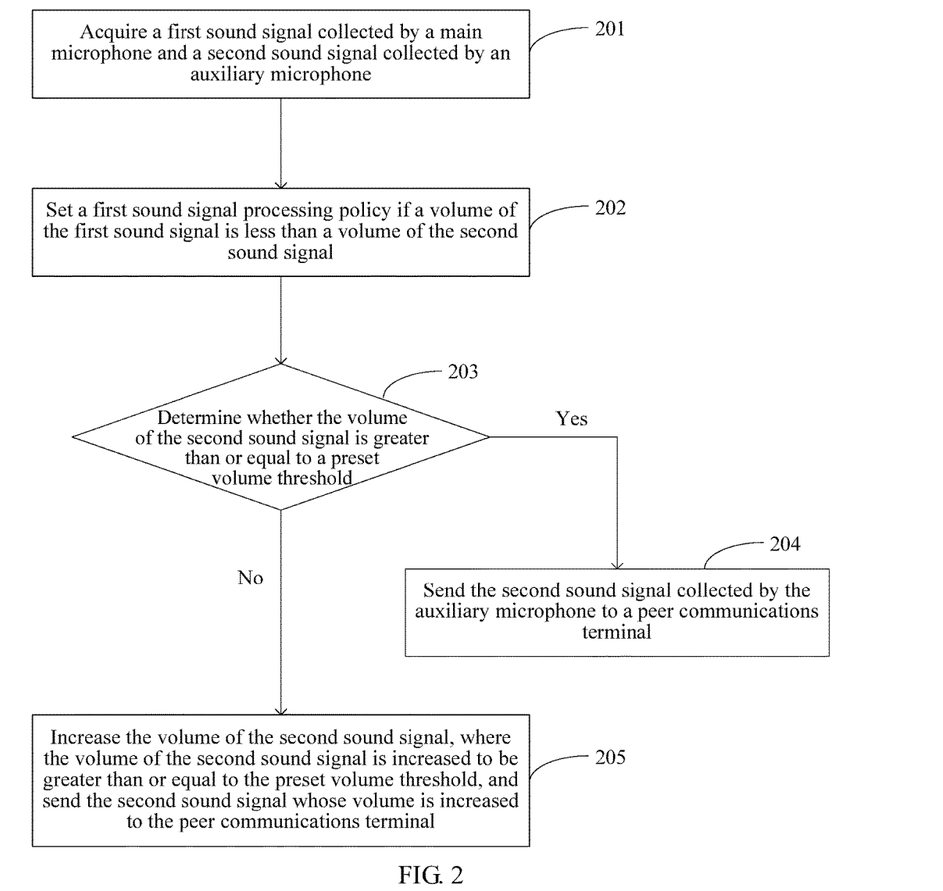
FIG. 2 is a flowchart of another embodiment of a method for processing a sound signal according to the present disclosure.

FIG. 2 is a flowchart of another embodiment of a method for processing a sound signal according to the present disclosure. As shown in FIG. 2, the method for processing a sound signal in this embodiment corresponds to the scenario described in the foregoing case 1, and the method may include the following steps.

Step 201: Acquire a first sound signal collected by a main microphone and a second sound signal collected by an auxiliary microphone.

Step 202: Set a first sound signal processing policy if a volume of the first sound signal is less than a volume of the second sound signal.

In this step, the volume of the first sound signal collected by the main microphone is compared with the volume of the second sound signal collected by the auxiliary microphone, and the first sound signal processing policy is used if the volume of the first sound signal is less than the volume of the second sound signal. Further, the first sound signal processing policy is a method described in step 203 to step 205.

Step 203: Determine whether the volume of the second sound signal is greater than or equal to a preset volume threshold, and perform step 204 if the volume of the second sound signal is greater than or equal to the preset volume threshold, or perform step 205 if the volume of the second sound signal is less than the preset volume threshold.

Based on step 202, a relationship between the volume of the second sound signal and the preset volume threshold is further determined, and step 204 is performed if the volume of the second sound signal is greater than or equal to the preset volume threshold, or if not, step 205 is performed.

Step 204: Send the second sound signal collected by the auxiliary microphone to a peer communications terminal.

The second sound signal collected by the auxiliary microphone is used as a sound signal to be sent to the peer communications terminal if the volume of the second sound signal is greater than or equal to the preset volume threshold.

Step 205: Increase the volume of the second sound signal, where the volume of the second sound signal is increased to be greater than or equal to the preset volume threshold, and send the second sound signal whose volume is increased to the peer communications terminal.

If the volume of the second sound signal is less than the preset volume threshold, the volume of the second sound signal is increased such that the increased volume of the second sound signal exceeds the volume threshold, and the second sound signal whose volume is increased is sent to the peer communications terminal.

In this embodiment of the present disclosure, for a case in which a volume of a first sound signal collected by a main microphone is less than a volume of a second sound signal collected by an auxiliary microphone, the second sound signal collected by the auxiliary microphone is sent to a peer communications terminal when the volume of the second sound signal is greater than or equal to a preset volume threshold, if the volume of the second sound signal is less than the preset volume threshold, after the volume of the second sound signal is increased, the second sound signal whose volume is increased is used as a sound signal to be sent to the peer communications terminal such that a volume of the sound signal to be sent to the peer communications terminal exceeds the preset volume threshold, thereby resolving a problem that in a communication process, because a finger blocks a hole of the main microphone, a user of the peer communications terminal cannot hear sound.

Figure 3:
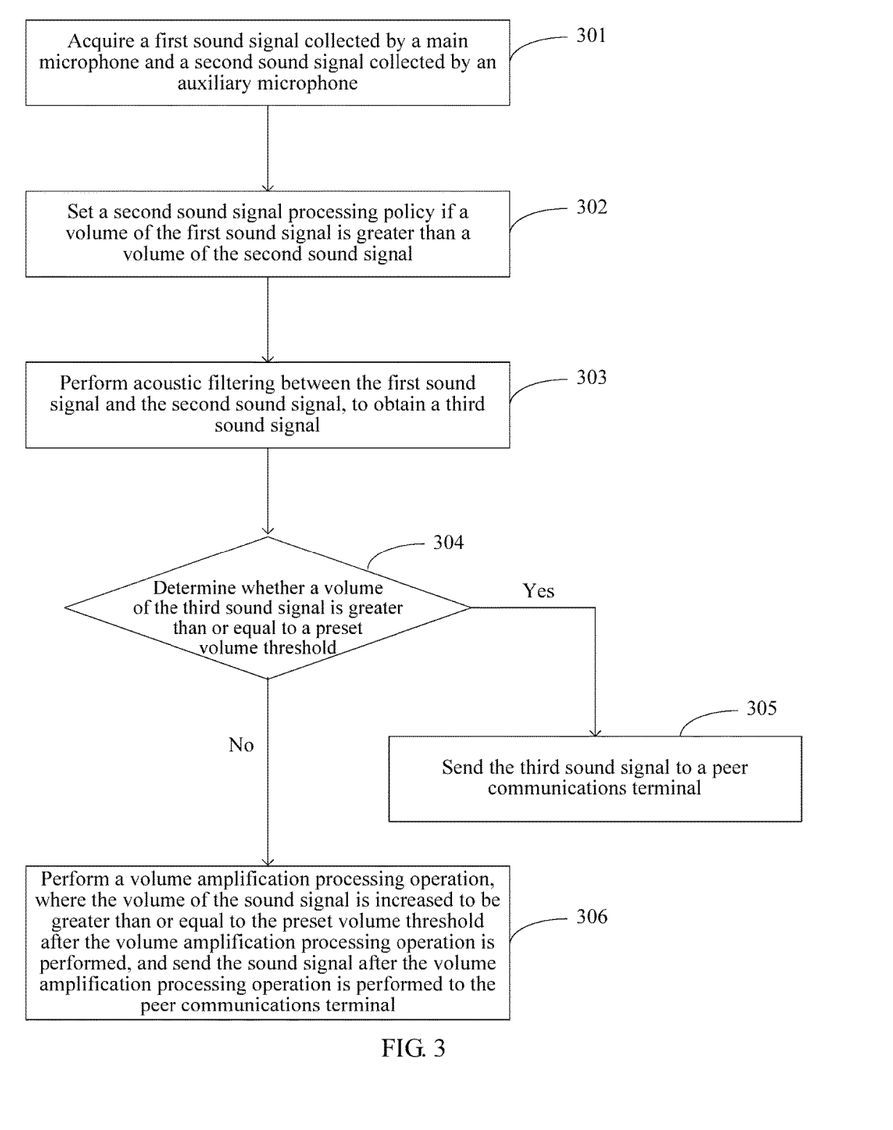
FIG. 3 is a flowchart of still another embodiment of a method for processing a sound signal according to the present disclosure.

FIG. 3 is a flowchart of still another embodiment of a method for processing a sound signal according to the present disclosure. As shown in FIG. 3, the method for processing a sound signal in this embodiment corresponds to the scenario described in the foregoing case 2, and the method may include the following steps.

Step 301: Acquire a first sound signal collected by a main microphone and a second sound signal collected by an auxiliary microphone.

Step 302: Set a second sound signal processing policy if a volume of the first sound signal is greater than a volume of the second sound signal.

The volume of the first sound signal collected by the main microphone is compared with the volume of the second sound signal collected by the auxiliary microphone, and the second sound signal processing policy is used if the volume of the first sound signal is greater than the volume of the second sound signal. Further, the second sound signal processing policy is a method described in step 303 to step 306.

Step 303: Perform acoustic filtering between the first sound signal and the second sound signal, to obtain a third sound signal.

Step 304: Perform step 305 if the volume of the third sound signal is greater than or equal to a preset volume threshold, or perform step 306 if the volume of the third sound signal is less than the preset volume threshold.

A result of the acoustic filtering between the first sound signal and the second sound signal is compared with the preset volume threshold, and step 305 is performed if the result is greater than or equal to the preset volume threshold, or if not, step 306 is performed.

Step 305: Send the third sound signal to a peer communications terminal.

The third sound signal is sent to the peer communications terminal if the volume of the third sound signal is greater than or equal to the preset volume threshold.

Step 306: Perform a volume amplification processing operation, where the volume of the sound signal is increased to be greater than or equal to the preset volume threshold after the volume amplification processing operation is performed, and send the sound signal after the volume amplification processing operation is performed to the peer communications terminal.

If the volume of the third sound signal is less than the preset volume threshold, the volume amplification processing operation is performed such that the volume of the sound signal obtained after the volume amplification processing operation is performed and sent to the peer communications terminal exceeds the preset volume threshold.

In this embodiment of the present disclosure, for a case in which a volume of a first sound signal collected by a main microphone is greater than a volume of a second sound signal collected by an auxiliary microphone, acoustic filtering is performed between the first sound signal and the second sound signal, to obtain a third sound signal, and when a volume of the third sound signal is greater than or equal to a preset volume threshold, the third sound signal is sent to a peer communications terminal. If the volume of the third sound signal is less than the preset volume threshold, a volume amplification processing operation is performed such that a volume of a sound signal obtained after the amplification processing operation is performed and sent to the peer communications terminal exceeds the preset volume threshold, thereby resolving a problem that in a communication process, because a size of a communications device is large, and a hole of the main microphone is far from the mouth of a user, a volume of voice heard by a user of a peer communications terminal is small or even no sound is heard.

Figure 4:
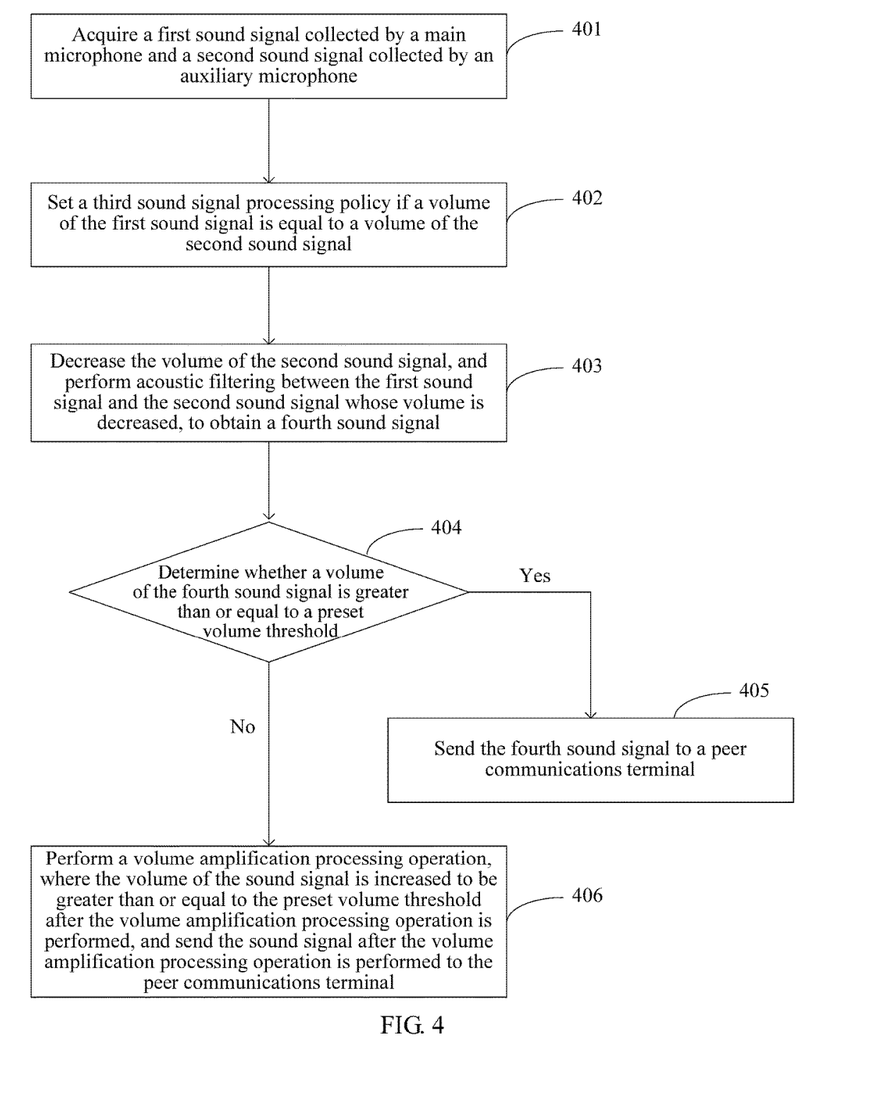
FIG. 4 is a flowchart of yet another embodiment of a method for processing a sound signal according to the present disclosure.

FIG. 4 is a flowchart of yet another embodiment of a method for processing a sound signal according to the present disclosure. As shown in FIG. 4, the method for processing a sound signal in this embodiment corresponds to the scenario described in the foregoing case 3, and the method may include the following steps.

Step 401: Acquire a first sound signal collected by a main microphone and a second sound signal collected by an auxiliary microphone.

Step 402: Set a third sound signal processing policy if a volume of the first sound signal is equal to a volume of the second sound signal.

The volume of the first sound signal collected by the main microphone is compared with the volume of the second sound signal collected by the auxiliary microphone, and the third sound signal processing policy is used if the volume of the first sound signal is equal to the volume of the second sound signal. Further, the third sound signal processing policy is a method described in step 403 to step 406.

Step 403: Decrease the volume of the second sound signal, and perform acoustic filtering between the first sound signal and the second sound signal whose volume is decreased, to obtain a fourth sound signal.

Step 404: Determine whether a volume of the fourth sound signal is greater than or equal to a preset volume threshold, and perform step 405 if the volume of the fourth sound signal is greater than or equal to the preset volume threshold, or perform step 406 if the volume of the fourth sound signal is less than the preset volume threshold.

A result of the acoustic filtering between the first sound signal and the second sound signal whose volume is decreased in the previous step is compared with the preset volume threshold, and step 405 is performed if the result is greater than or equal to the preset volume threshold, or if not, step 406 is performed.

Step 405: Send the fourth sound signal to a peer communications terminal.

The fourth sound signal is sent to the peer communications terminal if the volume of the fourth sound signal is greater than or equal to the preset volume threshold.

Step 406: Perform a volume amplification processing operation, where the volume of the sound signal is increased to be greater than or equal to the preset volume threshold after the volume amplification processing operation is performed, and send the sound signal after the volume amplification processing operation is performed to the peer communications terminal.

If the volume of the fourth sound signal is less than the preset volume threshold, the volume amplification processing operation is performed such that the volume of the sound signal obtained after the volume amplification processing operation is performed and sent to the peer communications terminal exceeds the preset volume threshold.

In this embodiment of the present disclosure, for a case in which a volume of a first sound signal collected by a main microphone is equal to a volume of a second sound signal collected by an auxiliary microphone, the volume of the second sound signal is decreased, and acoustic filtering is performed between the first sound signal and the second sound signal whose volume is decreased, to obtain a fourth sound signal, and when a volume of the fourth sound signal is greater than or equal to a preset volume threshold, the fourth sound signal is sent to a peer communications terminal. If the volume of the fourth sound signal is less than the preset volume threshold, an amplification processing operation is performed such that a volume of a sound signal obtained after the volume amplification processing operation is performed and sent to the peer communications terminal exceeds the preset volume threshold, thereby resolving a problem that in a communication process, because a distance between the main microphone and a user and a distance between the auxiliary microphone and the user are approximately the same, the sound signals collected by the main microphone and the auxiliary microphone are mutually canceled, and a volume of voice heard by a user of the peer communications terminal is small or even no sound is heard.

Based on the foregoing embodiment, in this embodiment, performing a volume amplification processing operation, where the volume of the sound signal is increased to be greater than or equal to the preset volume threshold after the volume amplification processing operation is performed, and sending the sound signal after the volume amplification processing operation is performed to the peer communications terminal may be further implemented using the following method. Decreasing the volume of the second sound signal, performing acoustic filtering between the first sound signal and the second sound signal whose volume is decreased, to obtain a fifth sound signal, where a volume of the fifth sound signal is greater than or equal to the preset volume threshold, and sending the fifth sound signal to the peer communications terminal, or increasing the volume of the first sound signal, performing acoustic filtering between the first sound signal whose volume is increased and the second sound signal, to obtain a sixth sound signal, where a volume of the sixth sound signal is greater than or equal to the preset volume threshold, and sending the sixth sound signal to the peer communications terminal, or decreasing the volume of the second sound signal, increasing the volume of the first sound signal, performing acoustic filtering between the first sound signal whose volume is increased and the second sound signal whose volume is decreased, to obtain a seventh sound signal, where a volume of the seventh sound signal is greater than or equal to the preset volume threshold, and sending the seventh sound signal to the peer communications terminal.

Preferably, in this embodiment, in the foregoing amplification processing operation, decreasing the volume of the second sound signal collected by the auxiliary microphone is preferentially selected, and then increasing the volume of the first sound signal collected by the main microphone is selected, to keep an original feature of the sound signal as much as possible.

In the foregoing embodiment, before determining a sound signal processing policy according to a relationship between values of a volume of the first sound signal and a volume of the second sound signal, the method further includes determining whether the volume of the first sound signal and the volume of the second sound signal are greater than a minimum volume threshold, and performing the step of determining a sound signal processing policy according to a relationship between values of a volume of the first sound signal and a volume of the second sound signal if both the volume of the first sound signal and the volume of the second sound signal are greater than the minimum volume threshold, where the minimum volume threshold is less than the preset volume threshold. In the foregoing embodiment, only when it is ensured that the acquired volumes of the first sound signal collected by the main microphone and the second sound signal collected by the auxiliary microphone are greater than or equal to the minimum volume threshold, the foregoing method for processing a sound signal is performed. For a case in which the acquired volumes of the first sound signal collected by the main microphone and the second sound signal collected by the auxiliary microphone are less than the minimum volume threshold, it is considered that the user probably does not speak, and no processing is performed in the present disclosure. The minimum volume threshold is a decibel value scarcely heard and described according to a hearing feature of persons.

Preferably, the minimum volume threshold is 20 dB, and the preset volume threshold is 40 dB.

Figure 5:
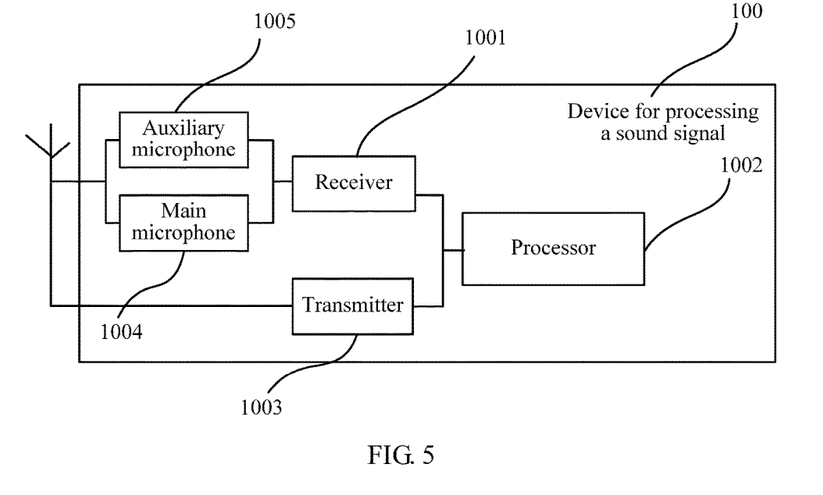
FIG. 5 is a schematic structural diagram of an embodiment of a device for processing a sound signal according to the present disclosure.

FIG. 5 is a schematic structural diagram of an embodiment of a device for processing a sound signal according to the present disclosure. As shown in FIG. 5, the device 100 for processing a sound signal for a communications device provided in this embodiment includes a main microphone 1004, an auxiliary microphone 1005, a receiver 1001, a processor 1002, and a transmitter 1003, where the main microphone 1004 and the auxiliary microphone 1005 are connected to the receiver 1001, and both the receiver 1001 and the transmitter 1003 may be connected to the processor 1002.

The main microphone 1004 collects a first sound signal, and the auxiliary microphone 1005 collects a second sound signal.

The receiver 1001 is configured to acquire the first sound signal collected by the main microphone 1004 and the second sound signal collected by the auxiliary microphone 1005.

The processor 1002 is configured to determine a sound signal processing policy according to a relationship between values of a volume of the first sound signal and a volume of the second sound signal.

The transmitter 1003 is configured to determine, according to the sound signal processing policy, a sound signal to be sent to a peer communications terminal, where the sound signal processing policy is used to ensure that a volume of the sound signal to be sent to the peer communications terminal exceeds a preset volume threshold.

The main microphone 1004 collects the first sound signal, for example, collects sound produced by a person, and the auxiliary microphone 1005 collects the second sound signal, for example, collects background noise. The auxiliary microphone 1005 is generally disposed at the top or another position of the communications device, and there may be multiple auxiliary microphones 1005. The receiver 1001 may be, for example, a receiver circuit for receiving sound signals collected by the main microphone 1004 and the auxiliary microphone 1005, the processor 1002 may be, for example, a central processing unit (CPU), and the transmitter 1003 may be, for example, a voice communications chip or the like. The device for processing a sound signal 100 may be a mobile phone, or another mobile terminal device having a communications module.

Optionally, the sound signal processing policy includes a first sound signal processing policy, and the processor 1002 is further configured to determine that the sound signal processing policy is the first sound signal processing policy if the volume of the first sound signal is less than the volume of the second sound signal, where the first sound signal processing policy includes determining whether the volume of the second sound signal is greater than or equal to the preset volume threshold, and the transmitter 1003 is further configured to send the second sound signal collected by the auxiliary microphone to the peer communications terminal if the volume of the second sound signal is greater than or equal to the preset volume threshold, or increase the volume of the second sound signal if the volume of the second sound signal is less than the preset volume threshold, where the volume of the second sound signal is increased to be greater than or equal to the preset volume threshold, and send the second sound signal whose volume is increased to the peer communications terminal.

The sound signal processing policy further includes a second sound signal processing policy, and the processor 1002 is further configured to determine that the sound signal processing policy is the second sound signal processing policy if the volume of the first sound signal is greater than the volume of the second sound signal, where the second sound signal processing policy includes performing acoustic filtering between the first sound signal and the second sound signal, to obtain a third sound signal, and determining whether a volume of the third sound signal is greater than or equal to the preset volume threshold, and the transmitter 1003 is further configured to send the third sound signal to the peer communications terminal if the volume of the third sound signal is greater than or equal to the preset volume threshold, or perform a volume amplification processing operation if the volume of the third sound signal is less than the preset volume threshold, where the volume of the sound signal is increased to be greater than or equal to the preset volume threshold after the volume amplification processing operation is performed, and send the sound signal after the volume amplification processing operation is performed to the peer communications terminal.

The sound signal processing policy further includes a third sound signal processing policy, and the processor 1002 is further configured to determine that the sound signal processing policy is the third sound signal processing policy if the volume of the first sound signal is equal to the volume of the second sound signal, where the third sound signal processing policy includes decreasing the volume of the second sound signal, performing acoustic filtering between the first sound signal and the second sound signal whose volume is decreased, to obtain a fourth sound signal, and determine whether a volume of the fourth sound signal is greater than or equal to the preset volume threshold, and the transmitter 1003 is further configured to send the fourth sound signal to the peer communications terminal if the volume of the fourth sound signal is greater than or equal to the preset volume threshold, and perform a volume amplification processing operation if the volume of the fourth sound signal is less than the preset volume threshold, where the volume of the sound signal is increased to be greater than or equal to the preset volume threshold after the volume amplification processing operation is performed, and send the sound signal after the volume amplification processing operation is performed to the peer communications terminal.

Optionally, the transmitter 1003 is further configured to decrease the volume of the second sound signal, perform acoustic filtering between the first sound signal and the second sound signal whose volume is decreased, to obtain a fifth sound signal, where a volume of the fifth sound signal is greater than or equal to the preset volume threshold, and send the fifth sound signal to the peer communications terminal, or increase the volume of the first sound signal, perform acoustic filtering between the first sound signal whose volume is increased and the second sound signal, to obtain a sixth sound signal, where a volume of the sixth sound signal is greater than or equal to the preset volume threshold, and send the sixth sound signal to the peer communications terminal, or decrease the volume of the second sound signal, increase the volume of the first sound signal, perform acoustic filtering between the first sound signal whose volume is increased and the second sound signal whose volume is decreased, to obtain a seventh sound signal, where a volume of the seventh sound signal is greater than or equal to the preset volume threshold, and send the seventh sound signal to the peer communications terminal.

Optionally, the transmitter 1003 is further configured to determine whether the volume of the first sound signal and the volume of the second sound signal are greater than or equal to a minimum volume threshold, perform the step of determining a sound signal processing policy according to a relationship between values of a volume of the first sound signal and a volume of the second sound signal if both the volume of the first sound signal and the volume of the second sound signal are greater than or equal to the minimum volume threshold, where the minimum volume threshold is less than the preset volume threshold.

Optionally, the minimum volume threshold is 20 dB, and the preset volume threshold is 40 dB.

The device for processing a sound signal 100 in this embodiment may be configured to execute a technical solution of a method for processing a sound signal provided in any embodiment of the present disclosure, and the implementation principles and technical effects thereof are similar, which are not described herein again.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

The integrated unit may be stored in a computer-readable storage medium when the integrated unit is implemented in the form of a software functional unit and sold or used as an independent product. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A device for processing a sound signal for a communications device, comprising:
   a main microphone configured to collect a first sound signal;
   an auxiliary microphone coupled to the main microphone and configured to collect a second sound signal;
   a receiver coupled to the main microphone and the auxiliary microphone and configured to acquire the first sound signal collected by the main microphone and the second sound signal collected by the auxiliary microphone;
   a processor coupled to the receiver and configured to determine a sound signal processing policy according to a relationship between values of a volume of the first sound signal and a volume of the second sound signal, the sound signal processing policy being a first sound signal processing policy when the volume of the first sound signal is less than the volume of the second sound signal, the first sound signal processing policy comprising determining whether the volume of the second sound signal is greater than or equal to the preset volume threshold; and
   a transmitter coupled to the processor and configured to:
      determine, according to the sound signal processing policy, a sound signal to be sent to a peer communications terminal, the sound signal processing policy ensuring a volume of the sound signal to be sent to the peer communications terminal exceeds a preset volume threshold;
      send the second sound signal collected by the auxiliary microphone to the peer communications terminal when the volume of the second sound signal is greater than or equal to the preset volume threshold; and
      increase the volume of the second sound signal to be greater than or equal to the preset volume threshold and send the second sound signal whose volume is increased to the peer communications terminal when the volume of the second sound signal is less than the preset volume threshold.

2. The device according to claim 1, wherein the processor is further configured to determine the sound signal processing policy based on whether the volume of the first sound signal and the volume of the second sound signal are both greater than or equal to a minimum volume threshold, the minimum volume threshold being less than the preset volume threshold.

3. The device according to claim 2, wherein the minimum volume threshold is 20 decibel (dB) and the preset volume threshold is 40 dB.

4. The device according to claim 1, wherein the first sound signal comprises a sound signal produced by a person and the second sound signal comprises an ambient noise signal.

5. The device according to claim 1, wherein the preset volume threshold is based on a decibel value of an indoor conversation.

6. A device for processing a sound signal for a communications device, comprising:
a main microphone configured to collect a first sound signal;
an auxiliary microphone coupled to the main microphone and configured to collect a second sound signal;
a receiver coupled to the main microphone and the auxiliary microphone and configured to acquire the first sound signal collected by the main microphone and the second sound signal collected by the auxiliary microphone;
a processor coupled to the receiver and configured to determine a sound signal processing policy according to a relationship between values of a volume of the first sound signal and a volume of the second sound signal, the sound signal processing policy being a second sound signal processing policy when the volume of the first sound signal is greater than the volume of the second sound signal, the second sound signal processing policy comprising:
performing acoustic filtering between the first sound signal and the second sound signal, to obtain a third sound signal; and
determining whether a volume of the third sound signal is greater than or equal to the preset volume threshold; and
a transmitter coupled to the processor and configured to:
determine, according to the sound signal processing policy, a sound signal to be sent to a peer communications terminal, the sound signal processing policy ensuring a volume of the sound signal to be sent to the peer communications terminal exceeds a preset volume threshold;
send the third sound signal to the peer communications terminal when the volume of the third sound signal is greater than or equal to the preset volume threshold; and
perform a volume amplification processing operation to increase the volume of the third sound signal to be greater than or equal to the preset volume threshold and send the third sound signal whose volume is increased to the peer communications terminal when the volume of the third sound signal is less than the preset volume threshold.

7. The device according to claim 6, wherein the transmitter is further configured to perform the volume amplification processing operation to increase the volume of the third sound signal by:
decreasing the volume of the second sound signal; and
performing acoustic filtering between the first sound signal and the second sound signal whose volume is decreased to obtain the third sound signal whose volume is increased.

8. The device according to claim 6, wherein the transmitter is further configured to perform the volume amplification processing operation to increase the volume of the third sound signal by:
increasing the volume of the first sound signal; and
performing acoustic filtering between the first sound signal whose volume is increased and the second sound signal to obtain the third sound signal whose volume is increased.

9. The device according to claim 6, wherein the transmitter is further configured to perform the volume amplification processing operation to increase the volume of the third sound signal by:
decreasing the volume of the second sound signal;
increasing the volume of the first sound signal; and
performing acoustic filtering between the first sound signal whose volume is increased and the second sound signal whose volume is decreased, to obtain the third sound signal whose volume is increased.

10. The device according to claim 6, wherein the processor is further configured to determine the sound signal processing policy based on whether the volume of the first sound signal and the volume of the second sound signal are both greater than or equal to a minimum volume threshold, the minimum volume threshold being less than the preset volume threshold.

11. The device according to claim 10, wherein the minimum volume threshold is 20 decibel (dB) and the preset volume threshold is 40 dB.

12. The device according to claim 6, wherein the first sound signal comprises a sound signal produced by a person and the second sound signal comprises an ambient noise signal.

13. The device according to claim 6, wherein the preset volume threshold is based on a decibel value of an indoor conversation.

14. A device for processing a sound signal for a communications device, comprising:
a main microphone configured to collect a first sound signal;
an auxiliary microphone coupled to the main microphone and configured to collect a second sound signal;
a receiver coupled to the main microphone and the auxiliary microphone and configured to acquire the first sound signal collected by the main microphone and the second sound signal collected by the auxiliary microphone;
a processor coupled to the receiver and configured to determine a sound signal processing policy according to a relationship between values of a volume of the first sound signal and a volume of the second sound signal, the sound signal processing policy permitting one of increasing or decreasing one of the volume of the first sound signal or the volume of the second sound signal, the sound signal processing policy being a third sound signal processing policy when the volume of the first sound signal is equal to the volume of the second sound signal, the third sound signal processing policy comprising:
decreasing the volume of the second sound signal;
performing acoustic filtering between the first sound signal and the second sound signal whose volume is decreased, to obtain a fourth sound signal; and
determining whether a volume of the fourth sound signal is greater than or equal to the preset volume threshold; and
a transmitter coupled to the processor and configured to:
determine, according to the sound signal processing policy, a sound signal to be sent to a peer communications terminal, the sound signal processing policy ensuring a volume of the sound signal to be sent to the peer communications terminal exceeds a preset volume threshold;

send the fourth sound signal to the peer communications terminal when the volume of the fourth sound signal is greater than or equal to the preset volume threshold; and perform a volume amplification processing operation to increase the volume of the fourth sound signal to be greater than or equal to the preset volume threshold and send the fourth sound signal whose volume is increased to the peer communications terminal when the volume of the fourth sound signal is less than the preset volume threshold.

15. The device according to claim 14, wherein the transmitter is further configured to:

decrease the volume of the second sound signal; and perform the acoustic filtering between the first sound signal and the second sound signal whose volume is decreased, to obtain the third sound signal whose volume is increased.

16. The device according to claim 14, wherein the transmitter is further configured to:

increase the volume of the first sound signal; and perform the acoustic filtering between the first sound signal whose volume is increased and the second sound signal, to obtain the third sound signal whose volume is increased.

17. The device according to claim 14, wherein the transmitter is further configured to:

decrease the volume of the second sound signal;

increase the volume of the first sound signal; and perform the acoustic filtering between the first sound signal whose volume is increased and the second sound signal whose volume is decreased, to obtain the third sound signal whose volume is increased.

18. The device according to claim 14, wherein the processor is further configured to:

determine whether the volume of the first sound signal and the volume of the second sound signal are both greater than or equal to a minimum volume threshold; and perform the operation of determining the sound signal processing policy according to the relationship between values of the volume of the first sound signal and the volume of the second sound signal, the minimum volume threshold being less than the preset volume threshold.

19. The device according to claim 18, wherein the minimum volume threshold is 20 decibel (dB) and the preset volume threshold is 40 dB.

20. The device according to claim 14, wherein the first sound signal comprises a sound signal produced by a person and the second sound signal comprises an ambient noise signal.

* * * * *

UNITED STATES PATENT AND TRADEMARK OFFICE
CERTIFICATE OF CORRECTION

PATENT NO. : 10,204,639 B2
APPLICATION NO. : 15/413509
DATED : February 12, 2019
INVENTOR(S) : Zaishang Wang et al.

Page 1 of 1

It is certified that error appears in the above-identified patent and that said Letters Patent is hereby corrected as shown below:

On the Title Page

Page 2, Item (56), FOREIGN PATENT DOCUMENTS, Line 8: "H108149197" should read "H08149197"

Signed and Sealed this
Nineteenth Day of March, 2019

Andrei Iancu
*Director of the United States Patent and Trademark Office*